(12) United States Patent
Boutourline-Young et al.

(10) Patent No.: US 12,516,469 B2
(45) Date of Patent: Jan. 6, 2026

(54) SYNTHETIC MATERIAL FABRIC WITH IMPROVED OPTICAL TRANSPARENCY EFFECT

(71) Applicant: SAATI S.P.A., Appiano Gentile (IT)

(72) Inventors: Irina Boutourline-Young, Appiano Gentile (IT); Paolo Canonico, Appiano Gentile (IT); Roberto Momente, Appiano Gentile (IT)

(*) Notice: Subject to any disclaimer, the term of this patent is extended or adjusted under 35 U.S.C. 154(b) by 187 days.

(21) Appl. No.: 17/758,804

(22) PCT Filed: Jul. 16, 2021

(86) PCT No.: PCT/IB2021/056427
§ 371 (c)(1),
(2) Date: Jul. 14, 2022

(87) PCT Pub. No.: WO2022/013823
PCT Pub. Date: Jan. 20, 2022

(65) Prior Publication Data
US 2023/0043798 A1    Feb. 9, 2023

(30) Foreign Application Priority Data

Jul. 16, 2020    (IT) .................. 102020000017359

(51) Int. Cl.
*D06M 11/83*    (2006.01)
*B32B 5/02*     (2006.01)
(Continued)

(52) U.S. Cl.
CPC ............. *D06M 11/83* (2013.01); *B32B 5/024* (2013.01); *B32B 7/023* (2019.01); *D06Q 1/04* (2013.01); *B32B 2307/4023* (2013.01)

(58) Field of Classification Search
CPC ........ D06M 11/83; B32B 5/024; B32B 7/023; B32B 2307/4023; D06Q 1/04; D06P 5/30;
(Continued)

(56) References Cited

U.S. PATENT DOCUMENTS 10,921,095 B1 *   2/2021   Emery ................... B32B 15/14
2011/0206945 A1   8/2011   Seidler
(Continued)

FOREIGN PATENT DOCUMENTS

DE      2914436 A1      3/1981
WO      88/00499 A1     1/1988
WO      2014/045088 A1  3/2014

OTHER PUBLICATIONS

ISR; European Patent Office; NL; Oct. 22, 2021.

*Primary Examiner* — Alicia J Weydemeyer
*Assistant Examiner* — Laura B Figg
(74) *Attorney, Agent, or Firm* — PatShegen IP; Moshe Pinchas

(57) ABSTRACT

A fabric formed by an interweaving of monofilaments (2) of synthetic material and which has two opposite metalized faces, in which at least one of said faces has at least one color (5) which determines the level of transparency.

Compared to the known fabrics for making transparent panels for the building sector, the fabric according to the invention offers the advantage of allowing control of the level of transparency to light, depending on the color applied to the metalized surface of the fabric.

10 Claims, 2 Drawing Sheets

(51) Int. Cl.
*B32B 7/023* (2019.01)
*D06Q 1/04* (2006.01)

(58) Field of Classification Search
CPC .. B44F 3/045; B44F 3/06; B44F 3/066; B44F 3/08; B44F 3/14
USPC .......................................................... 428/148
See application file for complete search history.

(56) References Cited

U.S. PATENT DOCUMENTS

| | | | |
|---|---|---|---|
| 2013/0212789 A1* | 8/2013 | Conolly | B32B 27/12 428/221 |
| 2014/0308869 A1* | 10/2014 | Seyboth | B32B 5/024 442/286 |
| 2015/0345074 A1 | 12/2015 | Brunswick | |
| 2017/0107661 A1* | 4/2017 | Rathi | C03C 25/10 |
| 2019/0099979 A1* | 4/2019 | Bee | B32B 1/00 |

* cited by examiner

SYNTHETIC MATERIAL FABRIC WITH IMPROVED OPTICAL TRANSPARENCY EFFECT

BACKGROUND OF THE INVENTION

The present invention relates to a fabric of synthetic material which has an improved optical transparency effect.

The field of the invention is that of fabrics of synthetic material used in the production of laminated glass or plastic panels with a light-shielding effect, for example in the building sector.

Laminated glass panels and the like are currently known, used in particular for the facades of buildings, that are capable of reflecting the light on the outer face of the building, while at the same time being transparent on the inner side of the facade. This result can be obtained, for example, with the aid of films for glass, or through the incorporation in glass or in transparent plastic of a fabric that is metalized on one side only. The metalized face, incorporated between the two sheets of glass or transparent plastic, is thus facing the outside of the building, reflecting the light and creating a shielding, privacy effect for an observer on the outside, while the non-metalized face is perceived as transparent by an observer inside the building.

The main drawback of the known panels described above is represented by the fact that the level of transparency of the fabric, through which the desired privacy effect is achieved, is determined not only by the percentage of the fabric's free surface area or of the opening of the meshes forming the fabric, but also by the metallic coating which is applied to form the metalized surface of the synthetic material fabric. For this reason, the known panel is limited to recreating the classic "one way mirror" effect, closely linked to the non-deposition of a metallic coating on one face of the fabric.

SUMMARY OF THE INVENTION

The main object of the present invention is to provide a fabric made of synthetic material which is able to regulate the effect of privacy or transparency to light perceived with different gradations on both faces of the fabric.

This and other objects are achieved with the fabric and method of claims 1 and 10, respectively. Preferred embodiments of the invention result from the remaining claims.

In relation to the known fabrics for producing transparent panels in the building sector, the fabric according to the invention offers the advantage of allowing control of the transparency effect, perceived on the basis of the color applied on one or both of the fabric's metalized faces.

A further advantage of the invention is represented by the possibility of creating, on the same metalized surfaces, a variable and modulable optical transparency effect on the surfaces themselves.

BRIEF DESCRIPTION OF THE DRAWINGS

These and other objects, advantages and characteristics result from the following description of some preferred embodiments of the fabric of the invention illustrated, by way of non-limiting examples, in the figures of the attached drawing sheets.

In these.

DESCRIPTION OF THE PREFERRED EMBODIMENTS

Figures 1, 2:
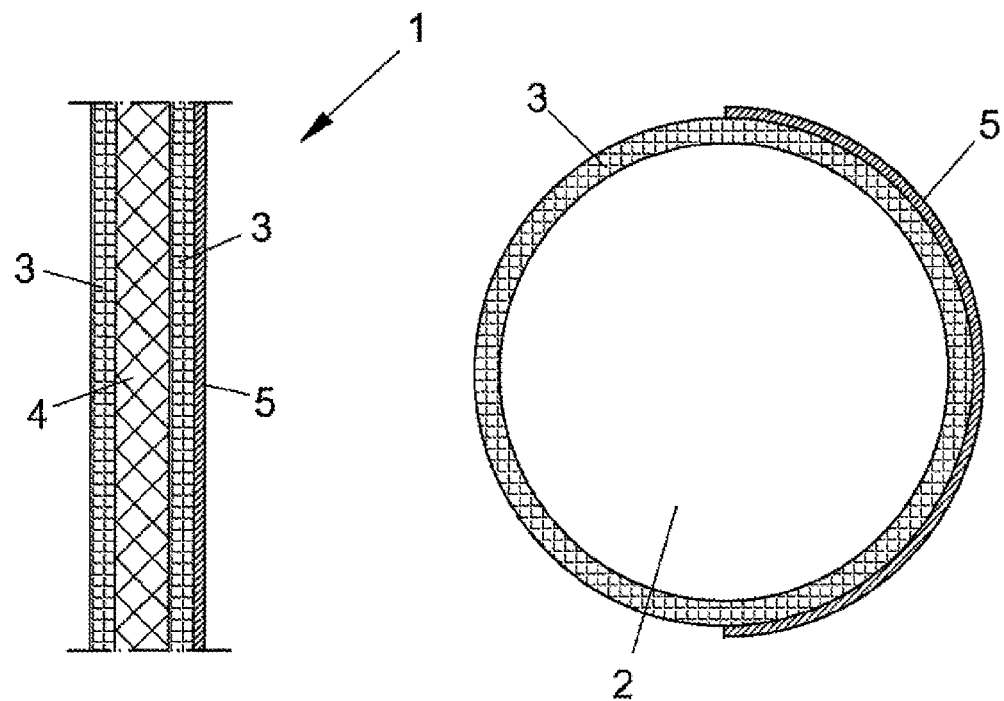
FIG. 1 is a sectional view of a first example of the fabric of the invention, metalized on both faces and bearing a color coating applied to one only of these metalized faces.
FIG. 2 is a sectional view of the detail of the filament used in producing the fabric of FIG. 1.

The fabric of the invention, indicated as a whole with 1 in FIG. 1, consists of a fabric 4 composed of a sheet material formed by an interweaving of filaments 2, preferably mono-filaments of synthetic material such as polyester and the like, which form a precision fabric in which the meshes, made from the interweaving of the filaments, have a calibrated and uniform opening. Preferably, the mesh opening covers 15-80% of the surface of fabric 4.

According to the invention, the surface of both opposite faces of the fabric sheet is metalized by coating with a layer 3 of metal such as aluminum, copper or other. The metallization process can be carried out under vacuum, through galvanic processes of electro-deposition, sputtering or vapor deposition, for example as described in US2015/0345074A1.

According to the invention, a color layer 5 is applied to at least a part of the metalized outer surface 3 of the mono-filaments 2, and therefore also of the fabric 4 that they form, in particular a semi-transparent acrylic-based ink, with UV light cross-linking, printed on the same surface by means of digital printing, by sublimation and the like, then fixed by passing under a UV lamp.

Suitable for the invention are for example the inks ANAPURNA 1500 RTR CYAN INK, ANAPURNA 1500 RTR BLACK INK, ANAPURNA 1500 RTR YELLOW INK, ANAPURNA 1500 RTR MAGENTA INK and ANAPURNA 1500 RTR CYAN INK from Agfa Graphics NV (Belgium).

Thanks to the presence of this color layer 5, a perceived transparency is obtained on the metalized surface 3 of the fabric 4, which depends on the brightness percentage of the chosen shade. In fact, the reflected light energy of the metalized surface 3 will be greater when the color chosen to form the layer 5 has a high brightness percentage (by brightness we mean one of the three color properties described in "A Color Nation: An Illustrated System Defining All Colors and Their Relations" 1941 by A. H. Munsell Oct. 15, 2004), whereas it will be lower as the brightness percentage decreases.

Also taking into account the chromatic colors and dividing them into families of pure colors, using the yellow and green colors, for equal brightness, the perceived screening property of the fabric is greater than for a red or a blue. The shielding effect is in turn directly proportional to the total average reflection factor of the measured visible range (380-780 nm).

According to the invention, therefore, the natural reflection of light on the metalized surface 3 of the fabric 4 is modified, in a more or less shielding sense, through the choice of the color that is printed on said metalized surface.

For its part, the other metalized face of the fabric not treated with the color makes the color applied on the opposite face brighter, thanks to the reflective capability of the metalized surface not covered with the color.

Figures 3, 4:
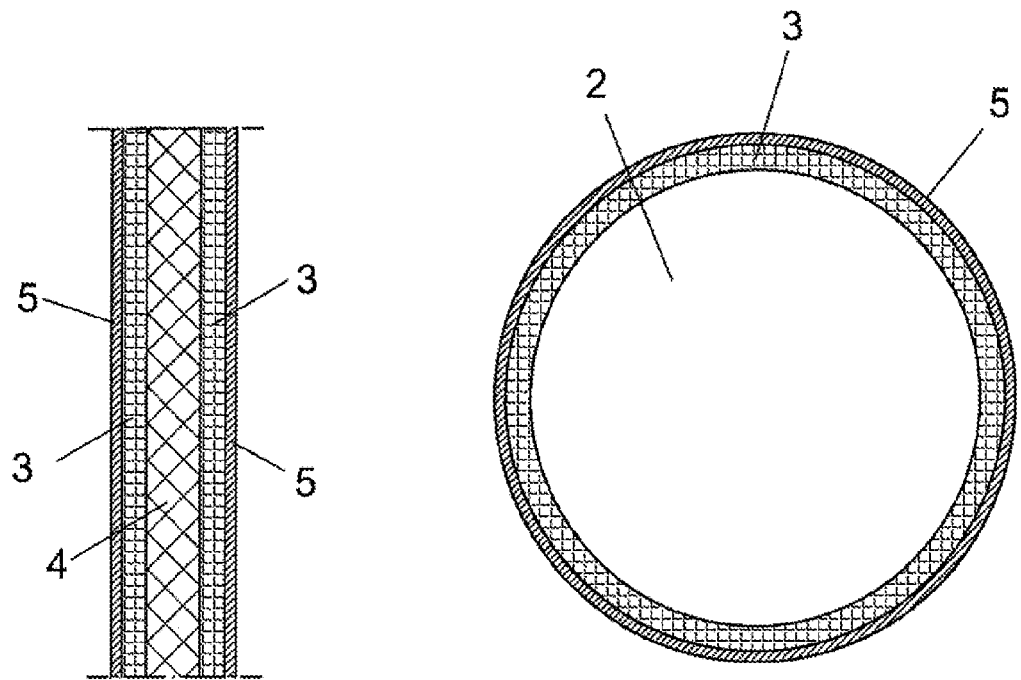
FIG. 3 is a sectional view of another example of the fabric of the invention, in which the color layer is applied on both metalized faces of the fabric.
FIG. 4 is a sectional view of the detail of the filament of the fabric of FIG. 3.

In the variant illustrated in FIGS. 3 and 4, the color layer 5 is applied to the entire metalized surface of the monofilament 2. In this way, both metalized faces of the fabric 4 have a color coating 5. In this embodiment, it is possible with the assistance of the color to give the fabric two opposite surfaces with an adjustable transparency effect.

Figure 5:
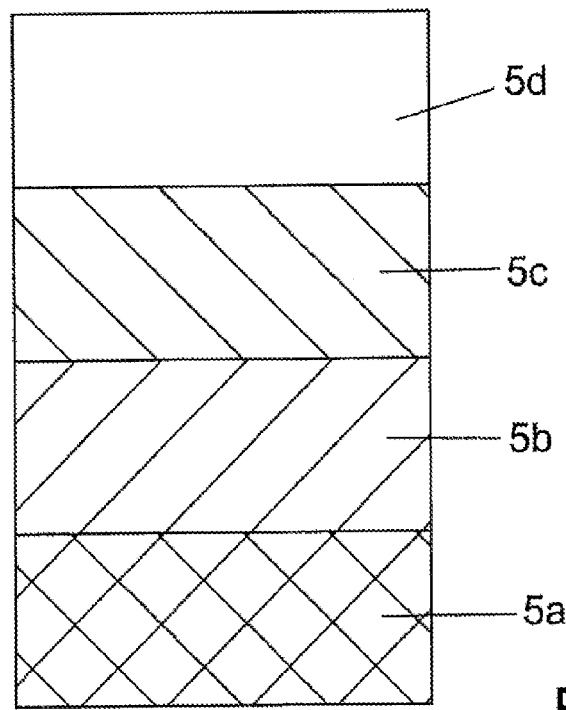
FIG. 5 illustrates in front view an example of the fabric of the invention, in which a metalized surface is printed with a color gradient that modulates the transparency effect on the same surface.

In the embodiment of the invention illustrated in FIG. 5, on one or both of the metalized faces 3 of the fabric 4, a color layer 5 is applied which has shades, for example distributed in color bands 5a, 5b, 5c, 5d on the surface of said metalized faces. The color can be applied in the form of a spot color, a gradient, or in the form of patterns and other ornamental or fantasy motifs.

In this way, on the same metalized surface of the fabric of the invention it is possible to obtain different gradients of optical transparency, depending on the different shades of the color layer 5 which is applied on this surface. This result is particularly advantageous if different levels of privacy are desired on a same shielding surface.

Figure 6:
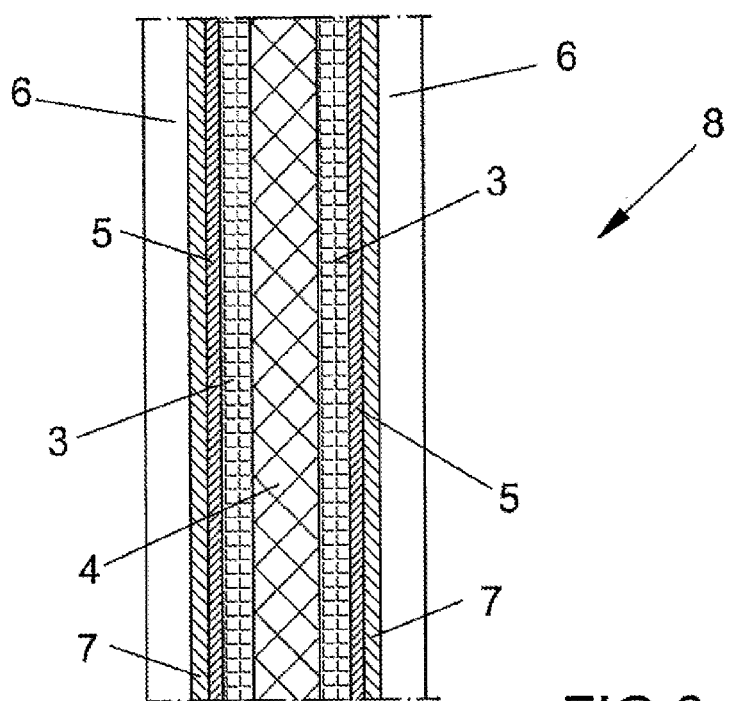
FIG. 6 is a sectional view of an example of a panel obtained with the fabric of FIG. 3.

As illustrated in FIG. 6, with the fabric of the invention it is possible to obtain a panel that incorporates the same fabric in a sandwich structure, completed by two sheets 6 of glass or transparent plastic. In the case of glass sheets, two layers 7 of polymeric sealant are also used to hold them together.

The fabric sheets according to the invention can be used in interior design as stretched panels or dividers or incorporated inside two glass or plastic sheets. In the glass field, where gradients are mainly created with the traditional ceramic frit, which has always had chromatic limitations and does not permit a flexible customization service, and more rarely with digital printing on EVA (a very fragile and expensive polymeric interlayer), the digital printing of gradients on the metalized fabric, subsequently incorporated into the glass, represents an interesting alternative from an industrial, functional and aesthetic point of view.

The invention will now be described with reference to the following examples, given merely by way of non-limiting illustrations of the invention.

Example 1: Color Printed on One Face of the Fabric and with the Other Face not Having Color Printing In this example, a polyester monofilament fabric with a diameter of 145 μm was prepared, in which the sheet has a thickness of 255 μm and the fabric has 44% of free surface. Both surfaces of the sheet were metalized with aluminum through the vapor deposition process (process described in patent EP2462274B1) and three samples printed with ink on one side only were prepared. In particular, achromatic colors were printed that are distinguished from each other by a different brightness percentage in the original color recipe. With the spectrophotometer from the company X-Rite Incorporated, Color i7 model, the brightness or light intensity L values on the finished product, which is the combination of a semitransparent ink and a metallic surface, were measured again. With the same spectrophotometer with flat grating operating solely on wavelengths in the visible range (380 nm-780 nm), the spectral reflection factor was measured of the light on the surface of the metalized fabric coated with the color. The instrument was used in the transmission and reflection mode (geometry D8°—diffused light with spectrum measurement angle 8°) and the light source used is a PULS XEN LAMP incandescent lamp from X-Rite. The computer tool Photoshop was used to create the printed colors, choosing the LAB or CIELAB or CIE LAB 1976 color space designed by the CIE (Commission Internationale de l'Éclairage: the international authority on light, lighting, color and color spaces) where L indicates the brightness and A and B refer to the color-opposing color dimensions, i.e. A (red-green) and B (yellow-blue). In this specific case, only the value of L (ciel*) was taken into account, while the values of A and B remain unchanged.

To demonstrate how a color's brightness percentage affects the reflectance average percentage of the fabrics of the invention, we printed a black (ANAPURNA 1500 RTR BLACK INK) with L=100 ciel* and a medium grey with L=50 ciel*, taking as extreme reference a very light grey with L=90 ciel*, where the greys are obtained by printing smaller quantities of black ink.

The results are set out in Table 1 below, where:

"Theoretical L print file" represents the brightness numerical value entered in the print file according to the LAB color space.

"L measured on fabric" represents the brightness numerical value measured through the spectrophotometer from X-Rite, Color i7 model, on the metalized fabric and printed with semi-transparent ink using the color recipe containing the theoretical L of reference.

The "Measured reflectance (%)", on the other hand, represents the total reflection factor in the visible range (380-780 nm) measured with the spectrophotometer from X-Rite, Color i7 model, in the transmission and reflection mode with geometry D:8°, where D is the illumination that occurs by diffused light while 8° is the angle of measurement of the spectrum and the light source used is a PULS XENO LAMP incandescent lamp from X-Rite.

Being achromatic colors, the coordinates of A and B will always be 0, which explains why they are not included in the table.

TABLE 1

| Fabric of the invention | Theoretical L print file (ciel*) | L measured on the fabric (ciel*) | Measured Reflectance (%) |
|---|---|---|---|
| Sample 1 with a printed face of black color | 0 | 59.77 | 26.16% |
| Sample 2 with a printed face of medium grey color | 50 | 70.74 | 40.665% |
| Sample 3 with a printed face of light grey color | 90 | 82.27 | 58.903% |

The results show that the reflectance percentage of the metalized fabric is influenced by the amount of brightness included in the color recipe of the print file and that the sample examined ranges from a minimum percentage of 26.16% to a maximum percentage of 58.903%.

Example 2: Color Applied on Both Faces of the Fabric

In this example, a polyester monofilament fabric with a diameter of 145 μm was prepared, in which the sheet has a thickness of 255 μm and the fabric has 44% of free surface. Both surfaces of the sheet were metalized with aluminum through vapor deposition as in Example 1 and three samples were prepared, printed with color on both of their faces. In particular, achromatic inks were used as in Example 1, but this time the opposite side printed with a red chromatic (ANAPURNA 1500 RTR MAGENTA INK) was measured, to demonstrate how one side affects the other. The same tools and methods were used as in Example 1.

The results are set out in Table 2 below.

TABLE 2

| Fabric of the invention | Theoretical L print file (ciel*) | Measured reflectance (%) |
| --- | --- | --- |
| Red face opposite to black | 50 | 25.32 |
| Red face opposite to medium grey | 50 | 29.4 |
| Red face opposite to light grey | 50 | 33.72 |

The results show that the reflectance percentage of one face is influenced by the reflectance percentage of the other face, which in turn is determined by the 20 degree of brightness of the printed color.

Example 3: Color Applied on One Face of the Fabric and with the Other Face not Having any Color Printing In this example, a polyester monofilament fabric with a diameter of 145 μm was prepared, in which the sheet has a thickness of 255 μm and the fabric has 44% of free surface. Both surfaces of the sheet were metalized with aluminum through vapor deposition as in Example 1 and four samples were prepared, printed with color on one face of the fabric only. In particular, the base chromatic inks ANAPURNA 1500 RTR CYAN INK, ANAPURNA 1500 RTR BLACK INK, ANAPURNA 1500 RTR YELLOW INK, ANAPURNA 1500 RTR MAGENTA INK and ANAPURNA 1500 RTR CYAN INK were used and, in order to verify that at the same light intensity L, using the LAB model, the yellows and greens are more reflective than the reds and greens, theoretical colors were created: a yellow and a blue with opposite values of B and a blue and a red with opposite values of A. With the spectrophotometer from X-Rite, Color i7 model, the values of L were measured again on the finished product, which is the combination of a semitransparent ink and a metal surface. With the same spectrophotometer with flat grating operating solely on wavelengths in the visible range (380 nm-780 nm) used in Example 1, the spectral reflection factor was measured of light on the metalized fabric surfaces coated with the color.

The results are set out in Table 3 below, where:

"A print file" represents the numerical value of A entered in the print file according to the LAB color space to create the color recipe.

"B print file" represents the numerical value of B entered in the print file according to the LAB color space to create the color recipe.

"Measured reflectance" represents the total reflection factor in the visible range (380-780 nm) measured with the spectrophotometer from X-Rite in the reflection mode with D-8° geometry.

The value of L is not included in the table because it remains unchanged at the 60 ciel* value. Only the coordinates of A and B vary.

TABLE 3

| Fabric of the invention | A print file (ciel*) | B print file (ciel*) | Measured Reflectance (%) |
| --- | --- | --- | --- |
| Sample 1 with a red color face | 127 | 0 | 36.1 |
| Sample 2 with a blue color face | −128 | 0 | 39.8 |
| Sample 3 with a yellow color face | 0 | 127 | 45.9 |
| Sample 4 with a green color face | 0 | −128 | 40.7 |

The results show that the surface of the metalized fabric of the invention printed with colors with equal brightness but with opposing color dimensions reflects slightly more and therefore appears more shielding, if the color printed on the surface falls into the category of yellows and greens.

Similar results can be obtained with colors applied in different ways and with different shades.

The invention claimed is:

1. Fabric formed from a sheet material comprising an interweaving of filaments, wherein a surface of both opposite faces of said sheet material is metalized and at least one of said metalized faces has at least one color layer, said color layer having different shades, said color layer comprising a semi-transparent ink exhibiting different reflectance percentages within the visible spectrum depending on said different shades of said color layer, said shades are selected such that transparency to light of the aforementioned fabric is proportional to the total average reflection factor of the measured visible range, said color is configured to be applied on said metalized faces by printing.

2. Fabric according to claim 1, wherein said semi-transparent ink is an acrylic-based ink with UV light cross-linking, wherein said at least one color layer gives said at least one metalized surface a transparency gradient that is a function of the brightness percentage of the same color.

3. Fabric according to claim 1, wherein said at least one color exhibits a high brightness percentage suitable for increasing the reflected light energy of said at least one metalized surface.

4. Fabric according to claim 1, wherein said at least one color layer exhibits a low brightness percentage suitable for reducing the reflected light energy of said at least one metalized surface.

5. Fabric according to claim 1, wherein both said metalized surfaces have at least one color layer.

6. Fabric according to claim 1, wherein said different shades are distributed on both metalized surfaces of said sheet material.

7. Fabric according to claim 1, wherein said filaments are monofilaments and said fabric is a fabric with calibrated mesh opening.

8. Panel, of the type comprising at least two sheets of transparent material, between which the fabric according to claim 1 is arranged.

9. Method for controlling and adjusting the effect of transparency to light of a synthetic material fabric bearing a metallization on both opposite faces of said synthetic material fabric, the method comprising printing on at least one of said metalized faces at least one color layer, said color layer having different shades, said color layer comprising a semi-transparent ink exhibiting different reflectance percentages within the visible spectrum depending on said different shades of said color layer, said shades are selected such that a transparency to light of said at least one metalized face is proportional to the total average reflection factor of the measured visible range.

10. Method according to claim 9, wherein said semi-transparent ink is an acrylic-based ink with UV light cross-linking.

\* \* \* \* \*